(12) United States Patent
Heary et al.

(10) Patent No.: US 11,578,704 B2
(45) Date of Patent: Feb. 14, 2023

(54) SOLAR POWERED ENERGY GENERATOR

(71) Applicant: Cosmic Energy Power Inc., Springville, NY (US)

(72) Inventors: William E. Heary, Union Springs, NY (US); Frederick M. Heary, Springville, NY (US)

(73) Assignee: Cosmic Energy Power Inc., Springville, NY (US)

( * ) Notice: Subject to any disclaimer, the term of this patent is extended or adjusted under 35 U.S.C. 154(b) by 384 days.

(21) Appl. No.: 16/699,919

(22) Filed: Dec. 2, 2019

(65) Prior Publication Data

US 2021/0164450 A1 Jun. 3, 2021

(51) Int. Cl.
*F03G 6/06* (2006.01)
*F24S 23/71* (2018.01)
*H02K 7/18* (2006.01)

(52) U.S. Cl.
CPC .............. *F03G 6/065* (2013.01); *F24S 23/71* (2018.05); *H02K 7/1823* (2013.01); *F03G 6/062* (2021.08); *Y02E 10/46* (2013.01)

(58) Field of Classification Search
CPC ..... Y02E 10/40–46; F03G 6/003; F03G 6/06; F03G 6/065; F03G 2006/008; F03G 2006/061; F03G 2006/062; F03G 6/004; F03G 6/061; F03G 6/062; F03G 6/066; F24S 23/71; F24S 10/40; F24S 10/45; F24S 20/20; F24S 20/40; F24S 80/50–58; F24S 2080/501–503

USPC ................ 126/610, 652–657, 712; 60/641.8, 60/641.11, 641.15
See application file for complete search history.

(56) References Cited

U.S. PATENT DOCUMENTS

| | | | | |
|---|---|---|---|---|
| 4,280,482 | A | * | 7/1981 | Nilsson, Sr. ............ F03G 6/067 126/618 |
| 4,289,118 | A | * | 9/1981 | Stark ....................... F24S 23/31 126/584 |
| 4,434,787 | A | * | 3/1984 | Young, II ................ F24S 23/77 359/872 |
| 9,349,899 | B2 | | 5/2016 | Schwartz et al. |
| 9,568,215 | B2 | | 2/2017 | Patwardhan et al. |
| 9,995,507 | B2 | | 6/2018 | Norman et al. |
| 10,203,134 | B2 | | 2/2019 | Johnson et al. |
| 10,302,320 | B2 | | 5/2019 | Howard |
| 10,348,241 | B1 | | 7/2019 | Ho |
| 10,358,944 | B2 | | 7/2019 | Wortmann et al. |
| 10,364,803 | B2 | | 7/2019 | Zeng et al. |

(Continued)

*Primary Examiner* — Mickey H France
(74) *Attorney, Agent, or Firm* — Pablo Meles; GrayRobinson, PA

(57) ABSTRACT

An energy power generator includes an energy source having a solar energy source further having at least one or more parabolic mirrors for focusing solar energy in a predetermined direction or focal point, an enclosed fluid circuit including a medium supply tank, a pump coupled to the medium supply tank, a boiler tank coupled to the pump, a turbine and generator coupled to the boiler tank, and a condenser having an output of the turbine as an input and the condenser further providing an output used as a feedback input to the medium supply tank. The generator can further include one or more parabolic mirrors oriented or focused towards the predetermined focal point on or through the boiler tank, where the boiler tank has heat applied to increase the pressure used to operate the turbine.

20 Claims, 4 Drawing Sheets

(56) References Cited

U.S. PATENT DOCUMENTS

| | | |
|---|---|---|
| 10,443,139 B2 | 10/2019 | Mills |
| 2007/0033828 A1 | 2/2007 | Hartkop et al. |
| 2008/0087276 A1* | 4/2008 | Zhao ................. F24S 23/79 |
| | | 126/683 |
| 2008/0149871 A1* | 6/2008 | Deng ................. F23C 1/08 |
| | | 251/142 |
| 2010/0065043 A1* | 3/2010 | Liu ................. F24S 70/225 |
| | | 126/684 |
| 2011/0115226 A1* | 5/2011 | Logan ................. F03G 6/065 |
| | | 60/641.15 |
| 2012/0023942 A1* | 2/2012 | Platero Gaona ........ F01K 17/06 |
| | | 60/641.8 |
| 2013/0055714 A1* | 3/2013 | Lakic ................. F24T 10/30 |
| | | 165/104.31 |
| 2013/0174550 A1* | 7/2013 | Ast ................. F01K 13/02 |
| | | 60/646 |
| 2013/0255666 A1* | 10/2013 | Perryman ............... F24S 50/20 |
| | | 126/696 |
| 2018/0083568 A1* | 3/2018 | Guha ................. F24S 23/82 |
| 2018/0224164 A1 | 8/2018 | Lakic |
| 2019/0226722 A1 | 7/2019 | Johnson et al. |
| 2020/0062614 A1* | 2/2020 | Nigrelli ................. C02F 1/14 |

* cited by examiner

20

30

200

SOLAR POWERED ENERGY GENERATOR

BACKGROUND

Field of the Invention

The present disclosure is directed to a method and system for generating power using solar power and more particularly to a method and system for generating power using an environmentally friendly and portable or non-portable system.

Description of the Related Art

Current methods to address some of the issues resolved by the current embodiments use a large stationary or fixed system that fails to include portability or alternative fuels as a backup or alternative power source. Some systems include mechanisms for orienting solar panels towards the sun dynamically, but further efficiencies can be achieved. Some systems fail to include safety features to avoid system failures.

DETAILED DESCRIPTION

Figure 1:
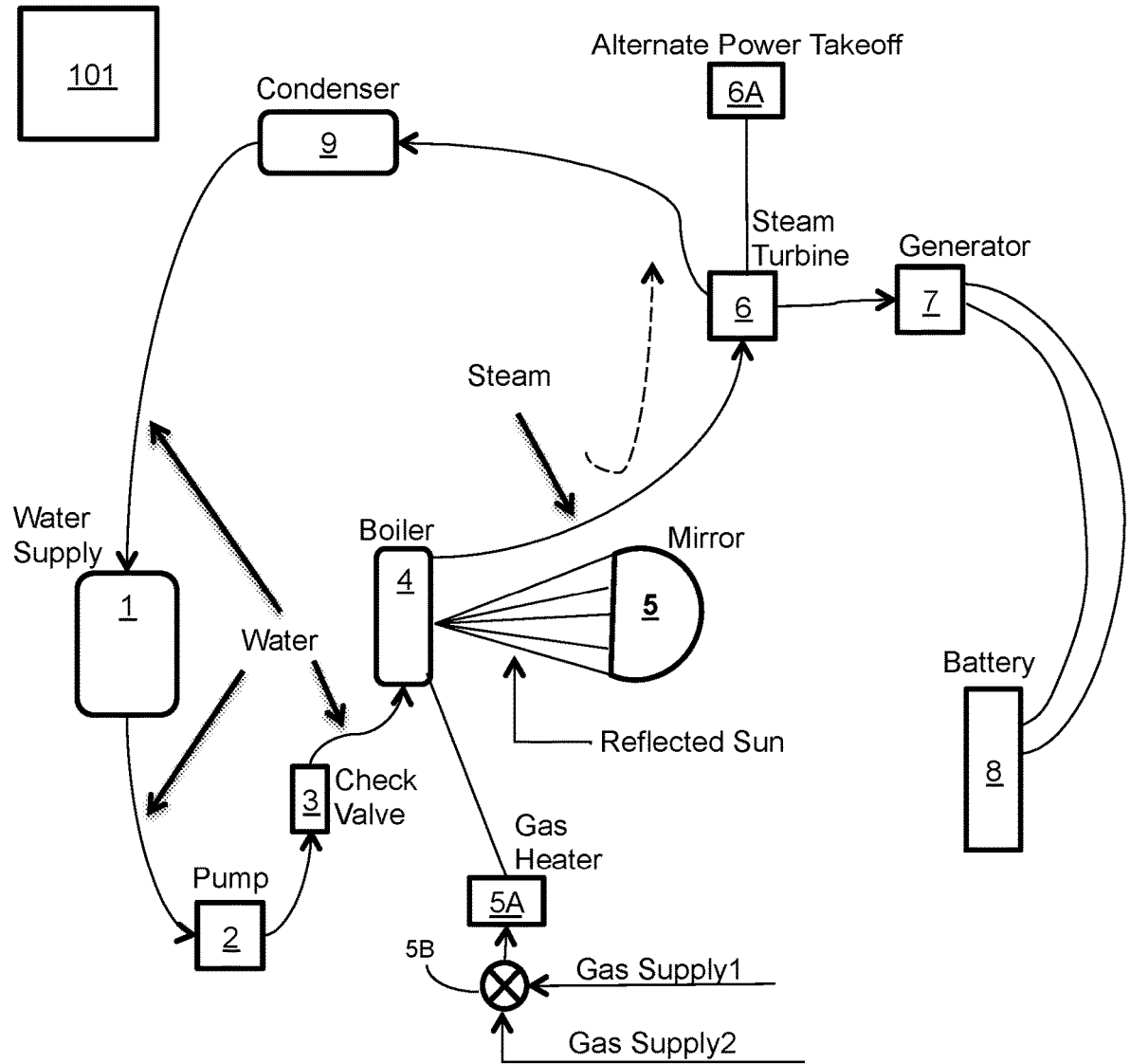
FIG. 1 illustrates a system for generating power using at least in part a solar powered energy generator in accordance with the embodiments.

In some embodiments, an energy power generator includes an energy source having a solar energy source further having at least one or more parabolic mirrors for focusing solar energy in a predetermined direction or focal point, an enclosed fluid circuit including a medium supply tank, a pump coupled to the medium supply tank, a boiler tank coupled to the pump, a turbine and generator coupled to the boiler tank, and a condenser having an output of the turbine as an input and the condenser further providing an output used as a feedback input to the medium supply tank. The generator can further include one or more parabolic mirrors selectively and rotatably focused towards the predetermined focal point on or through the boiler tank, where the boiler tank has heat applied to increase the pressure used to operate the turbine.

In some embodiments the boiler tank includes at least a portion formed from glass and where the one or more parabolic mirrors are focused toward the portion formed from glass to convert a liquid or a fluid medium in the boiler tank to a gas. In some embodiments the boiler tank further includes a heat exchanger within the boiler tank which can come in the form of a metal rod within the boiler tank.

In some embodiments the energy power generator is portable and self-contained while in other embodiments the system can be fixed. In some embodiments, the energy source further includes a natural gas heater coupled to the boiler tank, where the natural gas heater is configured with a natural gas supply. In some embodiments the energy power generator further includes a check valve coupled between the pump and the boiler tank while in other embodiments the check valve or an excessive steam release valve can be included as part of the boiler tank. In some embodiments, the boiler tank includes a portion made of glass and the energy power generator further includes a metal heat exchange rod within the boiler tank that lines up to a focal point of the parabolic mirror so as to provide a heat generation surface at or through the portion made of glass and thereby further enhance efficiency.

In some embodiments the system can further include a rigid and pivotable framework to connect the boiler tank to the one or more parabolic mirrors enabling the boiler tank and the at least one parabolic mirror to follow the sun causing a focal point to stay on a designated point on the boiler tank. In some embodiments, the system includes a direct power take-off that enables an elimination of a storage battery. Some embodiments include a battery and/or battery storage system while other embodiments do not.

In some embodiments, an energy power generator system can include an energy source consisting of solar energy source having at least one or more parabolic mirrors, an enclosed fluid circuit including a medium supply tank constructed of a translucent material such as glass, Plexiglas, or translucent metal such as Indium Tin Oxide, a pump coupled to the medium supply tank, a boiler tank coupled to the pump via a check valve, and a turbine coupled to the boiler tank. The generator can further include a condenser having an output of the turbine as an input and the condenser further providing an output used as a feedback input to the medium supply tank, wherein an exhaust from the turbine forced through the condenser causes the exhaust in the form of a gas to return to a liquid that gets stored in the medium supply tank and one or more parabolic mirrors selectively and rotatably focused towards the boiler tank, wherein the boiler tank has heat applied to it to increase the pressure used to operate the turbine. In some embodiments, a medium in the medium supply tank is water or butane. In some embodiments, the energy power generator further includes multiple orifices for propane and natural gas so the system is capable of using a dual alternative fuel system that has propane and natural gas regulators or sources that switch from one fuel to the other by use of an inline valve which will redirect propane or natural gas depending on which fuel to be used.

In some embodiments, the energy power generator further includes an electronic ignition system for a fuel system for uninterrupted energy generation. In some embodiments, the energy power generator further comprises a solar aligning system that rotates the parabolic mirror so as to ensure maximal utilization of sunlight and to minimize use of alternative energy sources of the system such as a natural gas or propane energy sources of the multi-flex energy power generator described above. In some embodiments, the energy power generating system includes a glass window formed on a portion of the boiler tank which includes a translucent metal material and a heat exchange rod within the boiler tank that lines up through the glass window to the focal point of the parabolic mirror so as to provide a heat generation surface thereby further enhancing efficiency.

In some embodiments, the energy power generator further includes one or more processors coupled to a thermostat to control movement of the mirror so as to regulate the distance between the parabolic mirror and boiler, thereby regulating the temperature of the fluid in the boiler.

Referring to FIGS. 1-4, various energy power generating systems (10, 20, 30, or 200) are illustrated in accordance with the embodiments that provide a flexible and environmentally friendly energy generating system. In various embodiments, the system can include an enclosed circuit with or without storage batteries, a tank with liquid, a pump, a check valve and a boiler, where the boiler has heat applied to it by a power source formed of a parabolic mirror directed towards the boiler and where the liquid converts to gas to operate or drive a turbine and electric generator.

Referring more particularly to FIG. 1, an energy power generator 10 includes an energy source having a solar energy source further having at least one or more parabolic mirrors 5 for focusing solar energy in a predetermined direction or focal point, an enclosed fluid circuit containing water or other fluid such as butane or propane and including a medium supply tank 1, a pump 2 coupled to the medium supply tank 1, a boiler tank 4 coupled to the pump 2, a turbine 6 and generator 7 coupled to the boiler tank 4, and a condenser 9 having an output of the turbine 6 as an input and the condenser 9 further providing an output used as a feedback input to the medium supply tank 1. The generator 6 can be coupled to the generator 7 to generate power that can be stored in a battery 8 for later use. The generator 7 can be an electric power generator that can power any number of loads (devices) within the specifications of the devices. The generator 10 can further include one or more parabolic mirrors 5 selectively and rotatably focused towards the predetermined focal point on or through the boiler tank 4, where the boiler tank 4 has heat applied to increase the pressure used to operate the turbine 6. The system 10 can further include a processor 101 coupled to one or more devices or sensors within the system to enable a more efficient and safe operation. The processor and sensors can be coupled wirelessly or wired to the various components in the system for guidance and control and/or monitoring. For example, the processor 101 can be coupled to the pump 2, the check valve 3, a supply valve 5B, an alternative power takeoff 6A or other devices to efficiently assist in turning on, off, or redirect sources of power or fuel supply as needed. The alternative power takeoff 6A can be coupled to the turbine 6. The alternative power takeoff 6A can eliminate the need for including a battery in some embodiments. In one embodiment, the processor 101 and rotation and/or tilt or orientation device 11 (shown in FIG. 4) can turn or tilt or re-orient the parabolic mirror 5 to maximize the use of the sun as the earth rotates during a day and/or as the earth orbits around the sun over the span of a year.

Figure 3:
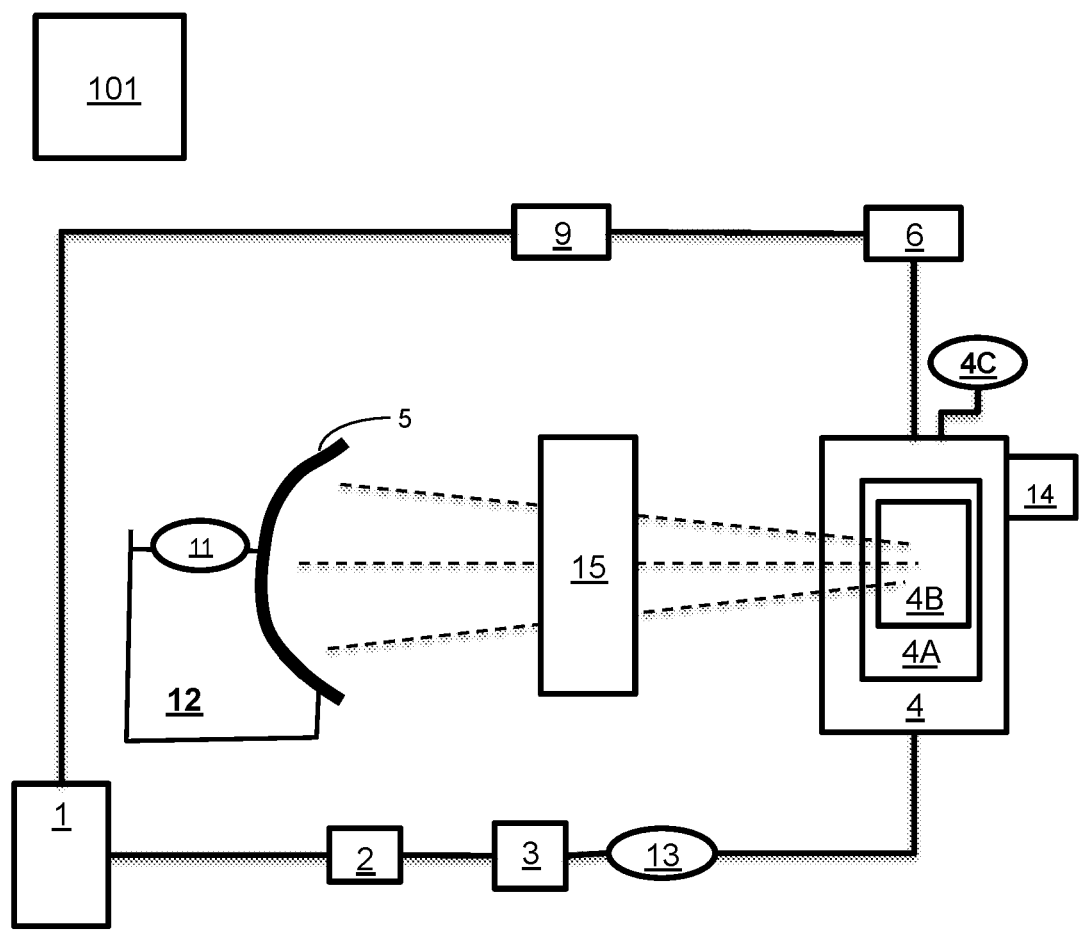
FIG. 3 yet another system for generating power using at least in part a solar powered energy generator in accordance with the embodiments.

In some embodiments as can be illustrated in the system 30 of FIG. 3, the boiler tank 4 includes at least a portion 4A formed from glass and where the one or more parabolic mirrors 5 are focused toward the portion 4A formed from glass to convert a liquid or a fluid medium in the boiler tank 4 to a gas. In some embodiments the boiler tank 4 further includes a heat exchanger 4B within the boiler tank 4 which can come in the form of a metal rod within the boiler tank 4. The orientation device 11 can be arranged and configured to dynamically move the parabolic mirror or mirrors 5 to focus towards the portion 4A and in some embodiments more particularly towards the heat exchanger 4B. Note that the boiler tank 4 can include just a portion 4A as glass or other translucent material or the portion 4A can encompass the entire boiler tank 4.

In some embodiments the energy power generator is portable and self-contained while in other embodiments the system can be fixed. In some embodiments as illustrated by FIG. 1, the energy source further includes a natural gas heater 5A coupled to the boiler tank 4, where the natural gas heater 5A is configured with a natural gas supply or a number of different gas supplies. If a number of alternative gas supplies are provided, the system 10 can include an inline switch valve 5B that directs one gas supply or another gas supply towards the gas heater 5A. In this regard, such a system can include multiple fuel sources that supply for example propane and/or natural gas so the system 10 is capable of using a dual alternative fuel system that has propane and natural gas regulators/sources that are capable of being switched from one fuel to the other simply by use of an inline valve which will redirect propane or natural gas depending on which fuel to be used. In some embodiments, the system can also include an electronic ignition system (not shown) for the fuel system so that energy generation will remain uninterrupted, such as during periods when the sun is not providing direct sunlight or otherwise. In some embodiments the energy power generator further includes a check valve 3 coupled between the pump 2 and the boiler tank 4 while in other embodiments the check valve or an excessive steam valve 4C can be included as part of the boiler tank 4. The excessive steam release valve 4C can be used to avoid excessive pressure build up within the boiler tank 4 and to avoid possible explosion of the boiler tank 4. In some embodiments as noted above, the boiler tank 4 includes a portion 4A made of glass and the energy power generator can further include a metal heat exchange rod 4B within the boiler tank 4 that lines up to a focal point of the parabolic mirror 5 (or mirrors 5) so as to provide a heat generation surface at or through the portion made of glass and thereby further enhancing efficiency. For simplicity, a single parabolic mirror 5 is shown, but the embodiments herein contemplate the use of one or more parabolic mirrors being oriented or directed so that the focal point of the reflected sunlight from the mirrors points to the boiler tank A, the portion 4A, and/or the heat exchange rod 4B. The orientation of the mirror or mirrors can be done selectively and/or programmatically.

In some embodiments the system 30 as shown in FIG. 3 can further include a rigid and pivotable framework 12 to coupe or orient the boiler tank 4 toward the one or more parabolic mirrors 5 enabling the boiler tank 4 and the at least one parabolic mirror 5 to follow the sun causing a focal point to stay on a designated point on the boiler tank as the earth moves relative to the sun. In some embodiments, the system as shown in FIG. 1 includes a direct power take-off 6A that enables an elimination of a storage battery. Some embodiments include a battery 8 and/or battery storage system while other embodiments do not.

Figure 2:
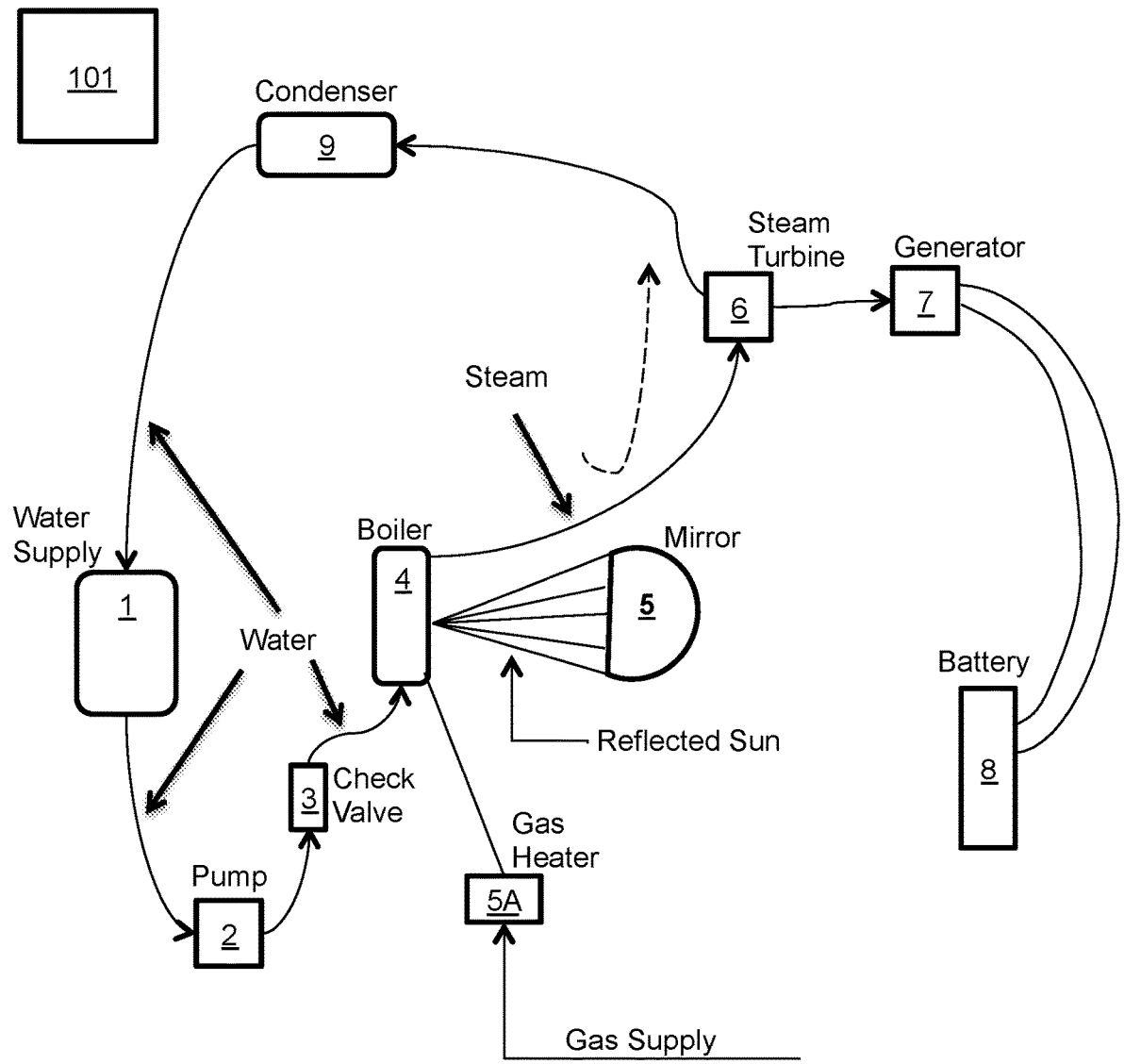
FIG. 2 illustrates another system for generating power using at least in part a solar powered energy generator in accordance with the embodiments.

In some embodiments, an energy power generator system 20 as shown in FIG. 2 can include an energy source consisting of solar energy source having at least one or more parabolic mirrors 5, an enclosed fluid circuit including a medium supply tank 1, a boiler tank 4 at least partially constructed of a translucent material such as glass, Plexiglas, or translucent metal such as Indium Tin Oxide, a pump 2 coupled to the medium supply tank 1, the boiler tank 4 coupled to the pump 2 via a check valve 3, and a turbine 6 coupled to the boiler tank 4. The generator 20 can further include a condenser 9 having an output of the turbine 6 as an input (to the condenser 9) and the condenser 9 further providing an output used as a feedback input to the medium supply tank 1, where an exhaust from the turbine 6 forced through the condenser 9 causes the exhaust in the form of a gas to return to a liquid that gets stored in the medium supply tank 1. The one or more parabolic mirrors 5 can be selectively and rotatably focused towards the boiler tank 4, where the boiler tank 4 has heat applied to it to increase the pressure used to operate the turbine 6. In some embodiments, a medium in the medium supply tank 1 (and used throughout the circuit) is water or butane. Note that in some embodiments butane can be used instead of water to suit different environments. For example in some embodiments, butane can be used in a space station or in other frigid earth climates to enable suitable operation of the generator in a given environment. In some embodiments as shown in FIG. 3, the system 30 can further include a flexible connection 13 to enable a flexible length fuel line running to the boiler ignition system to give longevity for the fuel feeding system. A similar connection such as flexible connection 13 can be provided between the boiler tank 4 and the turbine 6 to also provide a flexible steam line that can give longevity to the turbine energy line.

In some embodiments as shown in FIG. 3, the energy power generator 30 further comprises a solar aligning system 11 that rotates or orients the parabolic mirror 5 so as to ensure maximal utilization of sunlight and to minimize use of alternative energy sources of the system such as a natural gas or propane energy sources of the multi-flex energy power generator described above. In some embodiments, the energy power generating system includes a glass window formed on a portion 4A of the boiler tank 4 which can include a translucent metal material and a heat exchange rod 4B within the boiler tank 4 that lines up through the glass window to the focal point of the parabolic mirror 5 so as to provide a heat generation surface thereby further enhancing efficiency.

In some embodiments as shown in the system 30 of FIG. 3, the energy power generator further includes a one or more processors 101 coupled to a thermostat 14 to control movement of the mirror 5 so as to regulate the distance between the parabolic mirror 5 and boiler tank 4, thereby regulating the temperature of the fluid in the boiler tank 4. In some embodiments, the system 30 can further include optics 15 that can further focus or intensify the reflected sun beams or rays coming off of the parabolic mirror 5 and focus the beams or rays toward the boiler tank 4, portion 4A, or heat exchange rod 4B. In some embodiments the optics 15 can be a Fresnel lens or other lens that can focus or intensify the reflected beams of sun towards the boiler tank 4, portion 4A, or heat exchange rod 4B.

In some embodiments with reference to any of the embodiments shown in FIGS. 1-4, the various components can be arranged and configured to be in any number of parameters, positions and sizes as required for a particular embodiment. Some embodiments with smaller dimensions or parameters would likely be better suited for portable embodiments. For example, in a number of embodiments the mirror 5 can be from 2 to 36 inches, the turbine 6 can be from 2 to 12 inches, the media supply tank 1 can be from 1 gallon capacity and up, the boiler tank 4 can be 2×2×10 inches and up, the condenser 9 can be 2×2×10 inches and up, the generator 7 can be configured for 6 or 12 volt operation or other voltage as required, the battery 8 can be configured for 6 or 12 volt operation as required, and the horsepower generated by the generator system can be $\frac{1}{16}$ to 35 horsepower and up as required.

In some embodiments, the system can be a client device having one or more computer storage mediums containing computer instructions enabling secure access, storage, transport, and tracking of electronically tagged objects, one or more processors operationally coupled to the one or more computer storage mediums where the one or more processors perform the operations described above.

In some embodiments, the system can further include a computer-storage media coupled to a processor (or processors) and computer-executable instructions embodied in the computer-storage media that, when executed by one or more computing devices, perform a method that perform any number of steps as may be described herein.

Various embodiments of the present disclosure can be implemented on an information processing system. The information processing system is capable of implementing and/or performing any of the functionality set forth above. Any suitably configured processing system can be used as the information processing system in embodiments of the present disclosure. The information processing system is operational with numerous other general purpose or special purpose computing system environments, networks, or configurations. Examples of well-known computing systems, environments, and/or configurations that may be suitable for use with the information processing system include, but are not limited to, personal computer systems, server computer systems, thin clients, hand-held or laptop devices, notebook computing devices, multiprocessor systems, mobile devices, microprocessor-based systems, set top boxes, programmable consumer electronics, network PCs, minicomputer systems, mainframe computer systems, Internet-enabled television, and distributed cloud computing environments that include any of the above systems or devices, and the like. As noted previously, the data processing can be any number of data processing techniques suited for the controlled access or authentication, tracking, logging or counting or electronically tagged objects, logging or tracking of location of a lockbox in any setting or environment where objects need to be tracked and logged including setting such as medical facilities generally.

For example, a user with a mobile device may be in communication with a server configured to implement the system using the aforementioned elements, according to an embodiment of the present disclosure. The mobile device can be, for example, a multi-modal wireless communication device, such as a "smart" phone, configured to store and execute mobile device applications ("apps"). Such a wireless communication device communicates with a wireless voice or data network using suitable wireless communications protocols assuming the networks have the appropriate bandwidth to present data or real time images. Alternatively, the display system can be a computing and monitoring system with or without wireless communications as the case may be.

The system may include, inter alia, various hardware components such as processing circuitry executing modules that may be described in the general context of computer system-executable instructions, such as program modules, being executed by the system. Generally, program modules can include routines, programs, objects, components, logic, data structures, and so on that perform particular tasks or implement particular abstract data types. The modules may be practiced in various computing environments such as conventional and distributed cloud computing environments where tasks are performed by remote processing devices that are linked through a communications network. In a distributed cloud computing environment, program modules may be located in both local and remote computer system storage media including memory storage devices. Program modules generally carry out the functions and/or methodologies of embodiments of the present disclosure, as described above.

In some embodiments, a system includes at least one memory and at least one or more processor of a computer system communicatively coupled to the at least one memory. The at least one processor can be configured to perform a method including methods described above.

According to yet another embodiment of the present disclosure, a computer readable storage medium comprises computer instructions which, responsive to being executed by one or more processors, cause the one or more processors to perform operations as described in the methods or systems above or elsewhere herein.

Figure 4:
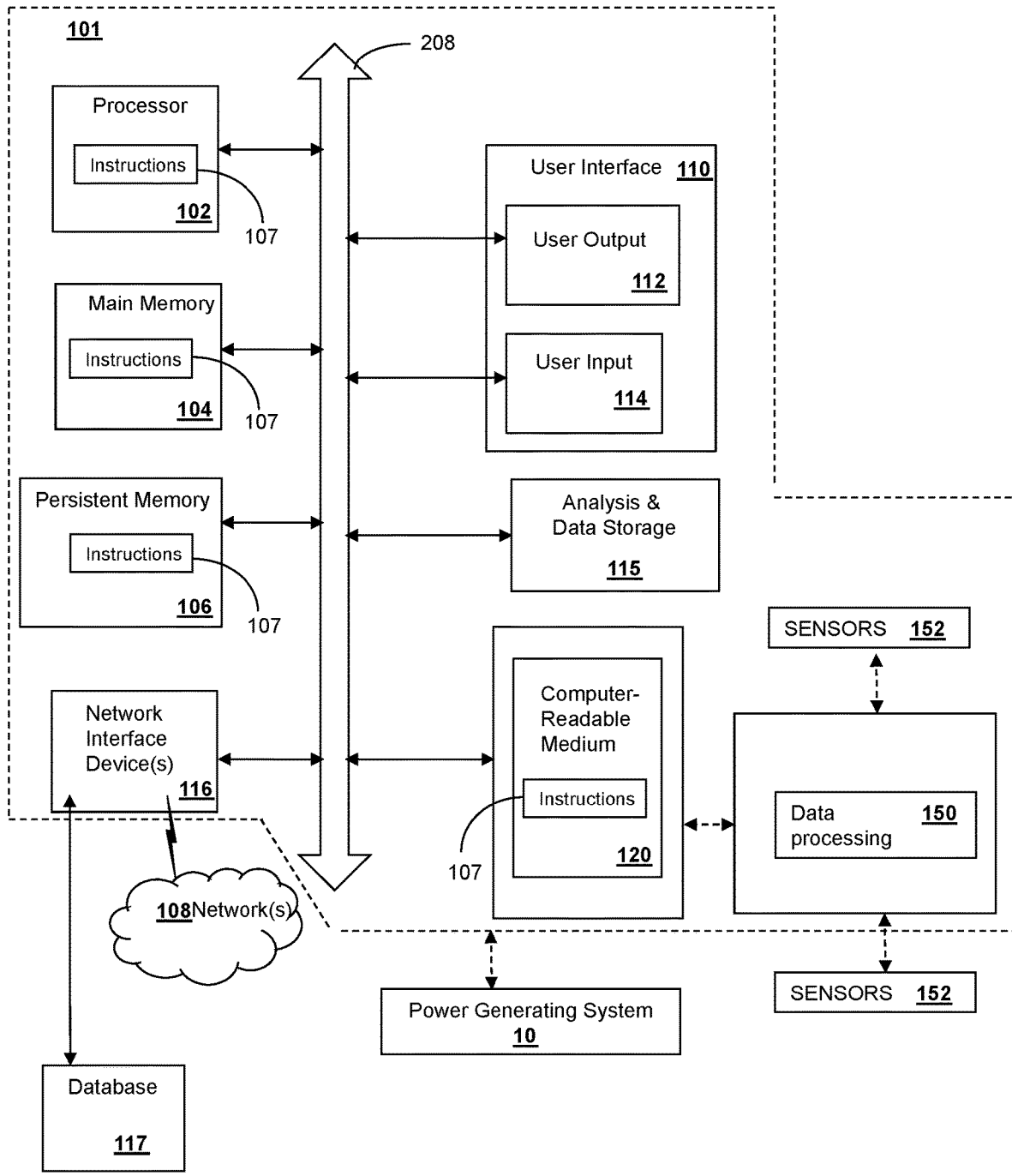
FIG. 4 is a block diagram of a system including a processing system in accordance with the embodiments.

As shown in FIG. 4, an information processing system 101 of a system 200 can be communicatively coupled with the data processing module 150 and a group of client or other devices, or coupled to a presentation device for display at any location at a terminal or server location. According to this example, at least one processor 102, responsive to executing instructions 107, performs operations to communicate with the processing module 150 via a bus architecture 208, as shown. The at least one processor 102 is communicatively coupled with main memory 104, persistent memory 106, and a computer readable medium 120. The processor 102 is communicatively coupled with an Analysis & Data Storage 115 that, according to various implementations, can maintain stored information used by, for example, the data processing module 150 and more generally used by the information processing system 200. The data processing module 150 can be coupled to one or more sensors 152 as needed. Such sensors can be thermostats, orientation sensors, rotation sensors, pressure sensors, location sensors, motion sensors, barcode scanners, fingerprint readers, proximity sensors, microphones, cameras, video cameras, location sensors, motion detectors, biometric reading devices (e.g., iris scanners, facial recognition scanners, voice detection devices) and other devices as contemplated herein. Some sensors 152 can be part of the processor 101 itself or operatively coupled to the sensors 152. Optionally, this stored information can be received from the client or other devices. For example, this stored information can be received periodically from the client devices and updated or processed over time in the Analysis & Data Storage 115. Additionally, according to another example, a history log can be maintained or stored in the Analysis & Data Storage 115 of the information processed over time. The data processing module 150, and the information processing system 200, can use the information from the history log such as in the analysis process and in making decisions related to a particular user's access or for logging electronically tagged objects according to a database of best practices for a particular procedure or procedures.

The computer readable medium 120, according to the present example, can be communicatively coupled with a reader/writer device (not shown) that is communicatively coupled via the bus architecture 208 with the at least one processor 102. The instructions 107, which can include instructions, configuration parameters, and data, may be stored in the computer readable medium 120, the main memory 104, the persistent memory 106, and in the processor's internal memory such as cache memory and registers, as shown.

The information processing system 200 includes a user interface (or interfaces) 110 that comprises a user output interface 112 and user input interface 114. Examples of elements of the user output interface 112 can include a display, a speaker, one or more indicator lights, one or more transducers that generate audible indicators, and a haptic signal generator or any of the interfaces illustrated or discussed with respect to the figures or elsewhere in the application. Examples of elements of the user input interface 114 can include a keyboard, a keypad, a mouse, a track pad, a touch screen, a touch pad, a microphone that receives audio signals, a camera, a video camera, a CT-Scanner, or any other scanner that scans images. Some user inputs can be sensors or vice-versa. The received audio signals or scanned images, for example, can be converted to electronic digital representations and stored in memory, and optionally can be used with corresponding voice or image recognition software executed by the processor 102 to receive user input data and commands, or to receive test data for example. The voice recognition software can be used to enter or check off items on a checklist and further provide data or text entry allowing the practitioner to enter notes as needed.

A network interface device 116 is communicatively coupled with the at least one processor 102 and provides a communication interface for the information processing system 100 to communicate via one or more networks 108. The networks 108 can include wired and wireless networks, and can be any of local area networks, wide area networks, or a combination of such networks. For example, wide area networks including the internet and the web can intercommunicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 116 can provide a communication interface for the information processing system 100 to access the at least one database 117 according to various embodiments of the disclosure.

The instructions 107, according to the present example, can include instructions for monitoring, instructions for analyzing, instructions for retrieving and sending information and related configuration parameters and data. It should be noted that any portion of the instructions 107 can be stored in a centralized information processing system or can be stored in a distributed information processing system, i.e., with portions of the system distributed and communicatively coupled together over one or more communication links or networks.

FIGS. 1-4 illustrate examples of systems, methods or process flows, according to various embodiments of the present disclosure, which can operate in conjunction with the information processing system 200 of FIG. 4.

In interpreting the present disclosure and the claims, references of the form "A and/or B" encompass any and every combination and subcombination of elements A and B, namely, any or all of the following: (i.) A, (ii.) B, (iii.) A or B, and (iv.) A and B. References of the form "A, B, and/or C" likewise encompass any and every combination and subcombination of elements A, B and C). Where the present disclosure or any of the claims may recite "a" or "a first" item or the equivalent thereof, such disclosure includes one or more such items and does not require or exclude two or more such items. Numerical or ordinal terms such as "first", "second", "third" etc. when used to refer to items are used solely to identify the items, and do not require or limit the number of such items elements and do not indicate, require or limit a particular position or order of such items unless expressly and clearly stated otherwise.

Descriptions made with reference to "embodiment", "embodiments", "some embodiments", "an embodiment", "preferred embodiment". "other embodiments" "alternative embodiments", "various embodiments" or the like mean that the description is applicable to at least one embodiment of the invention but not necessarily all embodiments. The terms "comprising," "including," "having," and the like, as used with respect to one or more embodiments, are synonymous. In some cases features, items steps or other subject matter are described herein as being optional or using terms such as "optional" or "optionally". However, lack use of such terms in connection with the description of any other features, items steps or other subject matter does not in any way mean or imply that such other features, items steps or other subject matter are required or are not optional.

As an aid to understanding, various actions, operations or steps may sometimes be presented herein or described herein in sequence. However, the order of description or written presentation herein is not to be construed to mean or imply that such must necessarily occur in a corresponding order or sequence unless otherwise expressly and clearly stated or logically essential. Some actions, operations or steps may permissibly be performed in an order or sequence other than the order of their description or written presentation herein unless otherwise expressly and clearly stated or logically essential. Unless otherwise expressly and clearly stated or logically essential, actions, operations or steps described herein may be combined or divided. Unless otherwise expressly and clearly stated or logically essential, any description herein of any one or more actions, operations or steps does not preclude any one or more other preceding, succeeding and/or intervening actions, operations or steps irrespective of whether or not such preceding, succeeding and/or intervening actions, operations or steps are described or disclosed herein.

Unless otherwise expressly and clearly stated or logically essential, any illustration, description, or reference herein of any one or more items, structures or elements being "connected to", "coupled to", "joined to", "joined with", "attached to", "mounted to", "mounted in" or "secured to" any one or more other specified items, structures or elements shall not be construed to preclude such connection, coupling, joint, attachment, mounting or securement being either made indirectly, by way of one or more other specified or unspecified items structures or elements, or being made directly.

Unless otherwise expressly and clearly stated or logically essential, any illustration, description, or reference herein of any one or more items, structures or elements "adjoining", any one or more other specified items, structures or elements, shall be construed to permit that such may adjoin either direct or indirectly. The term "adjoining" permits, but does not require, preclude the presence of items, structures or elements interposed between those describes as adjoining. Unless otherwise expressly and clearly stated or logically essential, any illustration, description, or reference herein to any one or more items, structures or elements being "beneath", "below", "above", "behind", "in front of", "between", "under", "over", "in", "within", "outside", "inside" any one or more other specified items, structures or elements and/or any other prepositions or prepositional phrases shall construed in a manner which permits, but does not require, contact or immediacy and any and all other prepositions and/or prepositional phrases shall be construed in that same manner.

As used herein, the term "material" encompasses, without limitation, unblended materials having a single constituent, blended materials having two or more constituents, composite materials, homogeneous materials and non-homogeneous materials.

While the invention has been described with reference to various preferred embodiments, it will be understood by those skilled in the art that various changes may be made and equivalents substituted for elements thereof without departing from the scope of the invention and that modifications may be made to adapt to a particular situation or application of the invention without departing from the scope of the invention. The invention is not limited to the particular embodiments disclosed. Rather, the invention covers all embodiments which are within the scope of the claims, either literally or under the Doctrine of Equivalents.

The invention claimed is:

1. An energy power generator, comprising:
   an energy source comprising a solar energy source having at least two or more parabolic mirrors for focusing solar energy in a predetermined direction toward a focal point;
   an enclosed fluid circuit including a medium supply tank;
   a pump coupled to the medium supply tank;
   a boiler tank coupled to the pump wherein the boiler tank is at least partially constructed of a translucent metal material;
   a turbine and generator coupled to the boiler tank;
   a condenser having an output of the turbine as an input and the condenser further providing an output used as a feedback input to the medium supply tank; and
   wherein the at least two or more parabolic mirrors selectively and rotatably focus toward the predetermined direction toward their focal point through the translucent metal material of the boiler tank, and wherein the boiler tank applies heat to increase the pressure used to operate the turbine.

2. The energy power generator of claim 1, wherein the boiler tank includes at least a portion formed from glass and wherein the at least two or more parabolic mirrors are focused through the portion formed from glass to convert a liquid or a fluid medium in the boiler tank to a gas.

3. The energy power generator of claim 1, wherein the boiler tank further includes a heat exchanger within the boiler tank.

4. The energy power generator of claim 1, wherein the energy power generator comprises optics placed between the at least two or more parabolic mirrors and the boiler tank to intensify sunlight reflected from the one or more parabolic mirrors on to at least a portion of the boiler tank.

5. The energy power generator of claim 1, wherein the energy source further comprises a natural gas heater coupled to the boiler tank, wherein the natural gas heater is configured with a natural gas supply.

6. The energy power generator of claim 1, wherein the energy power generator further comprises a check valve coupled between the pump and the boiler tank.

7. The energy power generator of claim 1, wherein the energy power generator further comprises a metal heat exchange rod within the boiler tank that lines up to the focal point of the at least two or more parabolic mirrors so as to provide a heat generation surface through the portion made of the translucent metal material and thereby further enhancing efficiency.

8. The energy power generator of claim 1, further comprising an excessive steam release valve for the boiler tank.

9. The energy power generator of claim 1, further comprising a rigid and pivotable framework to connect the boiler tank to the at least two parabolic mirrors enabling the boiler tank and the at least two parabolic mirrors to follow the sun causing a focal point to stay on a designated point on the boiler tank.

10. The energy power generator of claim 1, further comprising a direct power take-off that enables an elimination of a storage battery.

11. An energy power generator system, comprising:
- an energy source consisting of a solar energy source having at least two or more parabolic mirrors;
- an enclosed fluid circuit including a medium supply tank;
- a pump coupled to the medium supply tank;
- a boiler tank coupled to the pump via a check valve, wherein the boiler tank is at least partially constructed of a translucent metal material;
- a turbine coupled to the boiler tank;
- a condenser having an output of the turbine as an input and the condenser further providing an output used as a feedback input to the medium supply tank, wherein an exhaust from the turbine forced through the condenser causes the exhaust in the form of a gas to return to a liquid that gets stored in the medium supply tank; and
- wherein the at least two or more parabolic mirrors programmatically orient their focal point towards and through the translucent metal material of the boiler tank to have heat applied to increase the pressure used to operate the turbine.

12. The energy power generator system of claim 11, wherein a medium in the medium supply tank is butane.

13. The energy power generator system of claim 11, wherein the translucent metal material is indium tin oxide.

14. The energy power generator system of claim 11, wherein the translucent material is Indium Tin Oxide and wherein a medium in the medium supply tank is butane.

15. The energy power generator system of claim 11, wherein the energy power generator system further comprises multiple orifices for propane and natural gas so the system is capable of using a dual alternative fuel system that has propane and natural gas regulators or sources that switch from one fuel to the other by use of an inline valve which will redirect propane or natural gas depending on which fuel to be used.

16. The energy power generator system of claim 11, wherein the energy power generator system further comprises an electronic ignition system for a fuel system for uninterrupted energy generation.

17. The energy power generator system of claim 11, wherein the energy power generator system further comprises a solar aligning system that rotates or orients the at least two parabolic mirrors so as to ensure maximal utilization of sunlight and to minimize use of alternative gas energy sources.

18. The energy power generator system of claim 11, wherein the energy power generator system further comprises optics placed between the at least two or more parabolic mirrors and the boiler tank to intensify sunlight reflected from the two or more parabolic mirrors on to at least a portion of the boiler tank.

19. The energy power generator system of claim 11, wherein the energy power system comprises a glass window formed on a portion of the boiler tank which includes a translucent metal material and a heat exchange rod within the boiler tank that lines up through the glass window and the translucent metal material to the focal point of the at least two parabolic mirrors so as to provide a heat generation surface thereby further enhancing efficiency.

20. The energy power generator system of claim 11, wherein the energy power generator system further comprises a processor coupled to a thermostat to control movement of the at least two parabolic mirrors so as to regulate the distance between the at least two parabolic mirrors and the boiler, thereby regulating the temperature of the fluid in the boiler.

* * * * *